UNITED STATES PATENT OFFICE 2,612,475

LUBRICATING OIL ADDITIVE

Jeffrey H. Bartlett, Westfield, N. J., assignor to Standard Oil Development Company, a corporation of Delaware No Drawing. Application October 28, 1949, Serial No. 124,255

6 Claims. (Cl. 252—57)

This invention relates to novel and useful products formed by the polymerization of aryl acrylic acid esters. The invention also relates to copolymers of aryl acrylic acid esters with other polymerizable unsaturated materials. More particularly, the invention relates to polymers of a substituted or unsubstituted cinnamic acid ester in which the ester portion of the molecule contains a carbon chain having from 8 to 22 carbon atoms. The invention also relates particularly to lubricating oil compositions containing a minor proportion of these novel polymers and copolymers.

The novel polymers and copolymers which form the subject of this invention are useful for many purposes. They reduce the pour point of lubricating oils when blended therein in certain percentages, they are useful for improving the viscosity index of oils into which they are blended, and they are useful as oiliness agents. In general the overall engine conditions are improved when a blend of these materials and lubricating oil is used. However their particular advantage is in their use as pour depressants and viscosity index improvers.

One aspect of the invention comprises polymerizing an aryl acrylic acid ester having the general formula:

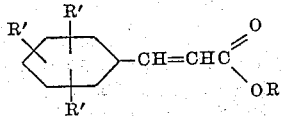

Wherein R represents the alcohol contributed portion of the ester and is derived from primary straight chain alcohols having a carbon chain length of from 8 to 22 carbon atoms and R' may be hydrogen, chlorine or a methyl group. Although ester groups containing from 8 to 22 carbon atoms are operable, carbon chains having from 10 to 20 carbon atoms are preferred. Secondary and branched chain alcohols may also be used to furnish the alcohol contributed portion.

It is also within the concept of this invention to utilize the so-called "Oxo-alcohols" in the esterification. These alcohols are formed by the hydrogenation of the reaction product obtained when an olefin is subjected to the action of carbon monoxide and hydrogen in the presence of a catalyst according to the procedure outlined in the patent to Roelen, U. S. Patent 2,327,066. Polymers and copolymers of olefins such as ethylene, propylene, butylene, amylene, etc. may be subjected to the "Ox-synthesis" process, resulting in a primary alcohol having one more carbon atom than the starting olefin.

Although the alcohols used in this esterification may be either saturated or unsaturated, saturated alcohols are preferred.

Some commercially available mixed alcohols which are especially suitable for use in this invention are products obtained by the hydrogenation of coconut oil. Such products are sold under the trade name "Lorol" and are mixtures of saturated straight chain alcohols having the following approximate composition:

| Percent of— | Lorol | Lorol B | Lorol R |
|---|---|---|---|
| $C_{10}$ | 4.0 | 3.0 | 1.0 |
| $C_{12}$ | 55.5 | 46.0 | 85.0 |
| $C_{14}$ | 22.5 | 24.0 | 13.0 |
| $C_{16}$ | 14.0 | 10.0 | 1.0 |
| $C_{18}$ | 4.0 | 17.0 | 0.0 |
| Ave. chain length | 12.8 | 13.5 | 12.2 |

Among the aryl acrylic acids which may be used in the formulation of the esters operable in this invention may be mentioned cinnamic acid, and its chloro and methyl derivatives, such as beta-(2-chlorphenyl) acrylic acid, beta-(3-chlorphenyl) acrylic acid, beta-(4-chlorphenyl) acrylic acid, beta-(2,4-dichlorphenyl) acrylic acid, beta-(2-methylphenyl) acrylic acid, beta-(3-methylphenyl) acrylic acid, beta-(4-methylphenyl) acrylic acid, beta-(2,3-dimethylphenyl) acrylic acid, beta-(2,4-dimethylphenyl) acrylic acid, beta-(3,5 dimethylphenyl) acrylic acid, beta-(2,4,5-trimethylphenyl) acrylic acid, etc. Although any of the above listed substituted or unsubstituted aryl acrylic acids may be used, cinnamic acid is the preferred embodiment of the invention.

The technique used in the polymerization of these aryl acrylic acid esters may be either the emulsion or the bulk polymerization technique using a peroxide-type catalyst, such as benzoyl peroxide, urea hydroperoxide, cumene hydroperoxide, tertiary butyl hydroperoxide, and the like. The redox type polymerization technique, whereby the polymerization reaction is activated by the presence of both oxidizing and reducing agents, may also be used.

The polymerization is carried out in the absence of air at a temperature of from about 25° to about 150° C., preferably 40° to 100° C., for a period of time of from about 2 to about 100 hours, preferably 5 to 20 hours. The polymerization should be carried out for a sufficient period of time and at a sufficient temperature to give a product having a molecular weight within a range of from about 1,000 to about 40,000 Staudinger. Polymers having a molecular weight below about 1,000 are generally found to be weak in pour depressant properties. Where viscosity index improving properties are desired, polymers having molecular weights in the range of from 5,000 to 25,000, especially 10,000 to 20,000, are preferred since they have good V. I. potency and also are more resistant to shear breakdown than higher molecular weight polymers.

Depending upon the characteristics desired to be utilized, these polymers are blended with lubricating oils in varying proportions. For example, when it is desired to blend a lubricating composition having a desirable lowered pour point, the polymer products of this invention are used in concentration varying from about 0.05 to 5.0 weight per cent. When it is desired to impart improved viscosity temperature relationships to the lubricating oil blend, higher percentages of the polymer are preferred, from 1.0 to 15.0 weight per cent being used. The lubricating oil with which these polymers may be blended may be either natural occurring mineral base lubricating oils of a paraffinic or naphthenic nature or the base stocks may be of the synthetic type, such as esters of diacids such as sebacates, long chain esters, polymerized cracked wax, alkylated aromatics, polyglycols, etc.

The invention may be further described by means of the following examples in which various of the esters of an aryl acrylic acid were polymerized.

EXAMPLE I

A 25 x 200 millimeter test tube was charged with 30 grams of Lorol B cinnamate. After heating to about 60° C. the air was displaced with nitrogen and 1.5 grams of benzoyl peroxide were added. This mixture was gently blown with nitrogen until most of the peroxide had dissolved. The test tube was then loosely stoppered and placed in an oven at 80° C. for 90 hours and a polymer resulted which had a viscosity at 210° F. of 74.9 Saybolt Universal seconds (S. U. S.).

EXAMPLE II

A polymerization reaction similar to that described in Example I was carried out using tetradecyl cinnamate in the place of the Lorol B cinnamate of Example I. The polymerization was continued for 16 hours at 60° C. and for 58 hours at 80° C. A polymer resulted which had a viscosity at 210° F. of 401 S. U. S.

EXAMPLE III

A polymerization similar to that described in Example I was carried out using cetyl cinnamate instead of the Lorol B cinnamate of Example I. After a polymerization reaction of 16 hours at 60° C. and 58 hours at 80° C. a poymer resulted which had a viscosity at 210° F. of 166 Saybolt seconds.

The polymers formed according to the procedures described above were blended with three lubricating oil base stocks and tested for pour depressant potency according to the A. S. T. M. pour depressant tests. The results of these tests are given in Table I below:

Table I

A. S. T. M. POUR POINT TESTS CINNAMATE ESTER POLYMERS

| Polymer | | Pour Points of Base Stock Blends | | |
|---|---|---|---|---|
| No. | Wt. Percent Concentration | Oil A [1] | Oil B [2] | Oil C [3] |
| None | | +10° F. | +20° F. | +30° F. |
| I | 0.5 | −15° F. | −15° F. | −5° F. |
| II | 0.2 | +5° F. | −15° F. | +5° F. |
| III | 0.2 | +5° F. | 0° F. | +20° F. |

[1] A conventionally refined Pennsylvania neutral having a viscosity at 210° F. of 45.3 S. U. S. and a V. I. of 100.
[2] A solvent extracted Mid-Continent neutral-bright stock blend having a viscosity at 210° F. of 46.1 S. U. S. and a V. I. of 103.
[3] A solvent extracted Mid-Continent neutral-bright stock blend having a viscosity at 210° F. of 43.6 S. U. S. and a V. I. of 95.

It will be noted by examination of the data given in Table I above that the novel polymers of this invention showed pour point depressing effects in all of the three types of base oils with which they were blended, reducing the pour point of the blend as much as 35° F. in the case of polymer II in oil B.

In addition to the polymers which may be prepared from esters of an aryl acrylic acid, whether substituted or unsubstituted, it has also been found, and forms a second aspect of this invention, that copolymers of these esters with other polymerizable unsaturated materials have pour depressant potency. The unsaturated materials contemplated for copolymerization with the esters of the aryl acrylic acids as described above, are such materials as the esters of the following acids: acrylic or methacrylic, itaconic, fumaric, maleic, sorbic, and the like. It has also been found that when the second monomer of this novel copolymer is a vinyl type compound such as vinyl esters, vinyl ethers, or the vinyl halides, the copolymer has desirable pour depressing characteristics. Although any of the unsaturated materials mentioned above are operable and within the concept of this invention, it is preferred to copolymerize an aryl acrylic acid with a compound such as the esters of acrylic and methacrylic acids, the methyl esters being especially preferred.

The conditions for the copolymerization are substantially the same as those described above for the polymerization reaction.

Various copolymers of the type mentioned above were prepared according to the following procedure.

EXAMPLE IV

A copolymerization reaction was carried out under conditions similar to those described in Example I in which 24 grams of cetyl cinnamate and 6 grams of methyl acrylate were copolymerized in the presence of 0.6 gram of benzoyl peroxide at 60° C. for 16 hours.

EXAMPLE V

A copolymerization similar to that described in Example IV was carried out substituting 32 grams of octadecyl cinnamate for the cetyl cinnamate of Example IV. Eight grams of methyl acrylate were used and 0.4 gram of benzoyl peroxide. A polymer resulted which had a viscosity of 210° F. of 2795 Saybolt seconds.

EXAMPLE VI

A copolymerization similar to that described in Example IV was carried out using 32 grams of tetradecyl cinnamate and 8 grams of vinyl acetate with 2 grams of benzoyl peroxide. The polymerization was carried on for 16 hours at 60° C. and 58 hours at 80° C. and yielded a copolymer having a viscosity at 210° F. of 113 Saybolt seconds.

The copolymers formed in accordance with Examples IV, V, and VI above were blended with three different types of lubricating oil base stocks and tested for pour point reduction according to the A. S. T. M. pour point test. The results of these tests are given in Table II below:

Table II

A. S. T. M. POUR POINT TESTS CINNAMATE ESTER COPOLYMERS

| Polymer | | Pour Points of Base Stock Blends | | |
|---|---|---|---|---|
| No. | Wt. Percent Concentration | Oil A | Oil B | Oil C |
| None | | +10° F. | +20° F. | +30° F. |
| IV | 0.5 | 0° F. | −10° F. | −5° F. |
| V | 0.2 | +5° F. | 0° F. | +10° F. |
| VI | 0.2 | 0° F. | −15° F. | 0° F. |

An examination of the data given in Table II above shows that the lubricating oil blends containing the copolymers formed in accordance with Examples IV, V, and VI reduced the pour point in all of the oil base stocks.

In summation, this invention comprises the preparation of novel and useful polymers and copolymers of aryl acrylic acid esters in which the alcohol contributed portion of the ester contains from 8 to 22 carbon atoms. It has been found that these polymers and copolymers impart desirable pour depressing characteristics to lubricating oil blends containing minor proportions of the polymer or copolymer products.

It is to be understood, of course, that these lubricating oil additives do not prohibit the addition of various other lubricating oil additives to blends in which they are used. For example, they are completely compatible with oxidation inhibitors, sludge dispersers, detergents, corrosion inhibitors, other viscosity index improvers, pour depressors and the like.

What is claimed is:

1. A lubricating oil composition which comprises a major proportion of a mineral lubricating oil base stock having combined therein a minor proportion sufficient to reduce the pour point thereof of a homopolymeric material formed by subjecting a compound having the general formula:

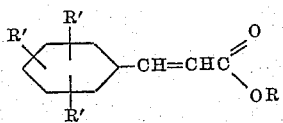

wherein R represents an alkyl group containing from 8 to 22 carbon atoms and R' is hydrogen, to a temperature of about 25° to about 150° C. for a period of time of from about 2 to about 100 hours in the absence of air and in the presence of a peroxide type catalyst.

2. A lubricating oil composition which comprises a major proportion of a mineral lubricating oil having combined therein from 0.05 to 5.0% by weight of a homopolymeric material prepared by subjecting a compound of the general formula:

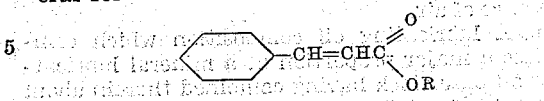

wherein R represent an alkyl group containing from 10 to 20 carbon atoms, to a temperature of from about 40° to about 100° C. for a period of time of from about 5 to about 20 hours in the presence of a peroxide-type catalyst and in the absence of air.

3. A lubricating oil composition which comprises a major proportion of a mineral lubricating oil base stock having combined therein about 0.2 to about 5.0% by weight of a homopolymeric material formed by subjecting a cinnamic acid ester in which the alcohol contributed portion of the ester comprises a mixture of hydrogenated coconut oil alcohols having an average chain length of about 13.5 carbon atoms, to a temperature of about 80° C. for about 90 hours in the absence of air and in the presence of a benzoyl peroxide catalyst.

4. A lubricating oil composition which comprises a major proportion of a mineral lubricating oil base stock having combined therein a minor proportion sufficient to reduce the pour point thereof of a copolymeric material formed by subjecting about 4 parts by weight of a compound having the general formula:

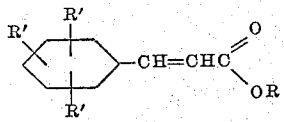

wherein R is an alkyl group containing from 8 to 22 carbon atoms and R' is selected from the class consisting of hydrogen, chlorine and methyl groups with about 1 part by weight of a compound having the general formula:

wherein R'' represents an alkyl group containing from 1 to 4 carbon atoms and X is selected from the class consisting of hydrogen and methyl groups, to a temperature of about 25° to about 150° C. for a period of time of from about 2 to about 100 hours in the absence of air and in the presence of a peroxide type catalyst.

5. A lubricating oil composition which comprises a major proportion of a mineral lubricating oil base stock having combined therein from about 0.05% to about 5.0% by weight of a copolymeric material formed by subjecting about 4 parts by weight of a compound having the general formula:

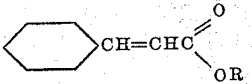

wherein R represents an alkyl group containing from 10 to 20 carbon atoms with about one part by weight of a compound of the general formula:

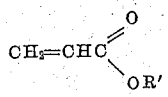

wherein R' represents an alkyl group containing from 1 to 4 carbon atoms, to a temperature of from about 40° to about 100° C. for a period of time of from about 5 to about 20 hours in the presence of a peroxide-type catalyst and in the absence of air.

6. A lubricating oil composition which comprises a major proportion of a mineral lubricating oil base stock having combined therein about 0.2% to about 5.0% by weight of a copolymeric material formed by subjecting about 4 parts by weight of cetyl cinnamate with about 1 part by weight of methylacrylate at a temperature of about 60° C. in the presence of about 0.6 gram of benzoyl peroxide for about 16 hours in the absence of air.

JEFFREY H. BARTLETT.

REFERENCES CITED

The following references are of record in the file of this patent:

UNITED STATES PATENTS

| Number | Name | Date |
|---|---|---|
| 2,020,714 | Wueff | Nov. 12, 1935 |
| 2,091,627 | Bruson | Aug. 31, 1937 |
| 2,318,959 | Muskat et al. | May 11, 1943 |
| 2,380,304 | Gleason | July 10, 1945 |
| 2,411,178 | Young et al. | Nov. 19, 1946 |
| 2,426,852 | Wright | Sept. 2, 1947 |
| 2,492,789 | Evans et al. | Dec. 27, 1949 |